US010377484B2

(12) United States Patent
Taylor et al.

(10) Patent No.: US 10,377,484 B2
(45) Date of Patent: Aug. 13, 2019

(54) UAV POSITIONAL ANCHORS

(71) Applicant: SONY INTERACTIVE ENTERTAINMENT INC., Tokyo (JP)

(72) Inventors: Michael Taylor, San Mateo, CA (US); Dennis Dale Castleman, Fremont, CA (US); Glenn Black, San Mateo, CA (US); Javier Fernandez Rico, Pacifica, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 287 days.

(21) Appl. No.: 15/393,875

(22) Filed: Dec. 29, 2016

(65) Prior Publication Data

US 2018/0095461 A1 Apr. 5, 2018

Related U.S. Application Data

(60) Provisional application No. 62/402,609, filed on Sep. 30, 2016.

(51) Int. Cl.
*G05D 1/00* (2006.01)
*G05D 3/00* (2006.01)
(Continued)

(52) U.S. Cl.
CPC ............ *B64C 39/024* (2013.01); *A63F 13/00* (2013.01); *A63H 27/12* (2013.01); *A63H 30/04* (2013.01);
(Continued)

(58) Field of Classification Search
None
See application file for complete search history.

(56) References Cited

U.S. PATENT DOCUMENTS 3,279,863 A 10/1966 Zuppiger
3,367,658 A 2/1968 Bayha
(Continued)

FOREIGN PATENT DOCUMENTS

WO WO 2018/063594 4/2018

OTHER PUBLICATIONS

U.S. Appl. No. 15/711,695, Dominic S. Mallinson, Unmanned Aerial Vehicle Movement Via Environmental Airflow, filed Sep. 21, 2017.
(Continued)

*Primary Examiner* — Bhavesh V Amin
(74) *Attorney, Agent, or Firm* — Polsinelli LLP

(57) ABSTRACT

Systems and methods for unmanned aerial vehicle (UAV) positional anchors. Signals may be broadcast via a signal interface of an anchor in a defined space which also includes a UAV. The UAV is at one location within the defined space, and the anchor is at another location within the defined space. A virtual environment may be generated that corresponds to the defined space. The virtual environment may include at least one virtual element, and a location of the virtual element within the virtual environment may be based on the location of the anchor within the defined space. A visual indication may be generated when the UAV is detected within a predetermined distance from the location of the anchor. In some embodiments, a visual element may be generated to augment the anchor where a location of the visual element is based on a location of the anchor within the defined space. The visual element may be changed when the UAV is flown to the location of the anchor within the defined space.

28 Claims, 4 Drawing Sheets

(51) Int. Cl.

| | |
|---|---|
| ***G06F 7/00*** | (2006.01) |
| ***G06F 17/00*** | (2019.01) |
| ***B64C 39/02*** | (2006.01) |
| ***G01S 1/00*** | (2006.01) |
| ***A63H 27/00*** | (2006.01) |
| ***A63H 30/04*** | (2006.01) |
| ***A63F 13/00*** | (2014.01) |
| ***G01S 19/48*** | (2010.01) |
| ***G01S 5/02*** | (2010.01) |

(52) U.S. Cl.

CPC .............. *G01S 1/00* (2013.01); *G01S 5/0268* (2013.01); *G01S 19/48* (2013.01); *B64C 2201/18* (2013.01)

(56) References Cited

U.S. PATENT DOCUMENTS 6,021,646 A 2/2000 Burley et al.
6,075,924 A 6/2000 Will
6,236,365 B1* 5/2001 LeBlanc .............. G01C 21/206 342/457
6,254,394 B1 7/2001 Draper et al.
7,988,154 B1 8/2011 Regan, Jr.
8,025,293 B1 9/2011 Crawford et al.
8,909,391 B1 12/2014 Peeters et al.
9,061,102 B2 6/2015 Levien et al.
9,218,316 B2 12/2015 Bernstein et al.
9,442,485 B1 9/2016 McDermott et al.
9,605,926 B1 3/2017 Means et al.
9,632,502 B1 4/2017 Levinson et al.
10,062,292 B2 8/2018 Blomberg et al.
10,067,736 B2 9/2018 Taylor
10,137,984 B1 11/2018 Flick
10,210,905 B2 2/2019 Castleman
10,248,118 B2 4/2019 Bernstein et al.
2003/0102016 A1 6/2003 Bouchard
2003/0152892 A1 8/2003 Huang et al.
2004/0008253 A1 1/2004 Monroe
2004/0115593 A1 6/2004 Hatlestad et al.
2004/0172187 A1 9/2004 Wiseman
2005/0004723 A1 1/2005 Duggan et al.
2005/0283281 A1 12/2005 Hartmann et al.
2006/0095262 A1 5/2006 Danielli
2006/0169508 A1 8/2006 Trojahn
2007/0061116 A1 3/2007 Bush
2007/0102876 A1 5/2007 Giegerich et al.
2007/0130599 A1 6/2007 Monroe
2008/0073839 A1 3/2008 Nally
2008/0093796 A1 4/2008 Narus et al.
2008/0144884 A1 6/2008 Habibi
2008/0154447 A1 6/2008 Spinelli
2008/0177994 A1 7/2008 Mayer
2008/0221745 A1 9/2008 Diamandis et al.
2008/0232602 A1 9/2008 Shearer
2009/0005167 A1 1/2009 Arrasvuori et al.
2009/0076665 A1 3/2009 Hoisington et al.
2009/0087029 A1 4/2009 Coleman et al.
2009/0118896 A1 5/2009 Gustafsson
2009/0125163 A1 5/2009 Duggan et al.
2009/0187389 A1 7/2009 Dobbins et al.
2009/0265105 A1* 10/2009 Davis .................... G01C 21/20 701/300
2010/0083038 A1 4/2010 Pierce et al.
2010/0096491 A1 4/2010 Whitelaw et al.
2010/0121574 A1 5/2010 Ariyur et al.
2010/0228468 A1 9/2010 D'Angelo
2010/0305724 A1 12/2010 Fry et al.
2011/0106339 A1 5/2011 Phillips et al.
2011/0184590 A1 7/2011 Duggan et al.
2011/0199376 A1 8/2011 Salemane
2011/0311949 A1 12/2011 Preston et al.
2012/0009845 A1 1/2012 Schmelzer
2012/0035799 A1 2/2012 Ehrmann
2012/0093320 A1 4/2012 Flaks et al.
2012/0188078 A1 7/2012 Soles et al.
2012/0212399 A1 8/2012 Border et al.
2012/0232867 A1 9/2012 Ahrens et al.
2013/0128054 A1* 5/2013 Densham ........... H04N 5/23296 348/169
2013/0137066 A1 5/2013 Pollak et al.
2013/0173089 A1 7/2013 Bernstein et al.
2013/0328927 A1 12/2013 Mount et al.
2014/0244075 A1 8/2014 Litwinowicz et al.
2014/0324253 A1 10/2014 Duggan et al.
2015/0063610 A1 3/2015 Mossner
2015/0209659 A1 7/2015 Barr et al.
2015/0248785 A1 9/2015 Holmquist
2015/0323931 A1 11/2015 Downey et al.
2015/0346722 A1 12/2015 Herz et al.
2015/0378019 A1 12/2015 Schissler et al.
2016/0035224 A1 2/2016 Yang et al.
2016/0078759 A1 3/2016 Nerayoff et al.
2016/0091894 A1 3/2016 Zhang et al.
2016/0111006 A1 4/2016 Srivastava et al.
2016/0117853 A1 4/2016 Zhong et al.
2016/0117931 A1 4/2016 Chan et al.
2016/0196754 A1 7/2016 Surace
2016/0205654 A1 7/2016 Robinson
2016/0217698 A1 7/2016 Liu et al.
2016/0253908 A1 9/2016 Chambers et al.
2016/0257001 A1 9/2016 Blasdel et al.
2016/0284125 A1 9/2016 Bostick et al.
2016/0291593 A1 10/2016 Hammond et al.
2016/0299506 A1 10/2016 Bruggeman et al.
2016/0330601 A1 11/2016 Srivastava
2016/0358497 A1 12/2016 Nguyen et al.
2017/0036771 A1 2/2017 Woodman et al.
2017/0039859 A1 2/2017 Hu et al.
2017/0045886 A1 2/2017 Liu et al.
2017/0053169 A1 2/2017 Cuban et al.
2017/0061813 A1 3/2017 Tao et al.
2017/0069214 A1 3/2017 Dupray et al.
2017/0116723 A1 4/2017 Aughey
2017/0158353 A1 6/2017 Schmick
2017/0165575 A1 6/2017 Ridihalgh et al.
2017/0166204 A1 6/2017 Yoo et al.
2017/0168488 A1 6/2017 Wierzynski et al.
2017/0168556 A1 6/2017 Goslin et al.
2017/0173451 A1 6/2017 Pedersen et al.
2017/0182407 A1 6/2017 Steele et al.
2017/0251323 A1 8/2017 Jo et al.
2017/0295446 A1 10/2017 Thagadur
2017/0329347 A1* 11/2017 Passot ................. A47L 11/4011
2017/0337826 A1* 11/2017 Moran .................... G01S 1/042
2017/0343375 A1 11/2017 Kamhi et al.
2017/0371353 A1 12/2017 Millinger
2017/0372617 A1 12/2017 Bruno et al.
2018/0322699 A1 1/2018 Gray et al.
2018/0032071 A1 2/2018 Wieneke
2018/0039262 A1 2/2018 Fox et al.
2018/0046187 A1 2/2018 Martirosyan et al.
2018/0046560 A1 2/2018 Gillies et al.
2018/0093171 A1 4/2018 Mallinson
2018/0093768 A1 4/2018 Castleman
2018/0093781 A1 4/2018 Mallinson
2018/0094931 A1 4/2018 Taylor
2018/0095433 A1 4/2018 Rico
2018/0095461 A1* 4/2018 Taylor .................. G06T 19/006
2018/0095463 A1 4/2018 Castleman
2018/0095714 A1 4/2018 Taylor
2018/0096455 A1 4/2018 Taylor
2018/0096611 A1 4/2018 Kikuchi
2018/0098052 A1 4/2018 Black
2018/0246514 A1 8/2018 Mitomo et al.
2018/0259339 A1 9/2018 Johnson et al.
2018/0321692 A1 11/2018 Castillo-Effen et al.
2018/0329413 A1 11/2018 Charalambides et al.
2019/0019329 A1 1/2019 Eyler et al.

(56) References Cited

U.S. PATENT DOCUMENTS

| | | | |
|---|---|---|---|
| 2019/0047700 | A1 | 2/2019 | Liu et al. |
| 2019/0075252 | A1 | 3/2019 | Zhao et al. |
| 2019/0079722 | A1 | 3/2019 | Taylor |

OTHER PUBLICATIONS

U.S. Appl. No. 15/711,961, Dominic S. Mallinson, Unmanned Aerial Vehicle Movement Via Environmental Interactions, filed Sep. 21, 2017.
Fujii, Katsuya; Higuchi, Keita; Rekimoto, Jun; "Endless Flyer: A Continuous Flying Drone with Automatic Battery Replacement", 2013 IEEE 10th International Conference on Ubiquitous Intelligence & Computing and 2013 IEEE 10th International Conference on Autonomic & Trusted Computing, pp. 216-223.
Williams, Elliot; "Real-life Space Invaders with Drones and Lasers," Hackaday, Sep. 19, 2016.
PCT Application No. PCT/US2017/048064 International Search Report and Written Opinion dated Nov. 7, 2017.
U.S. Appl. No. 15/394,313 Office Action dated Oct. 18, 2017.
U.S. Appl. No. 16/121,441, Michael Taylor, Proximity Based Noise and Chat, filed Sep. 4, 2018.
U.S. Appl. No. 15/394,391 Office Action dated Aug. 24, 2018.
U.S. Appl. No. 15/394,329 Office Action dated Aug. 7, 2018.
U.S. Appl. No. 15/394,267 Office Action dated Aug. 24, 2018.
U.S. Appl. No. 15/394,285 Office Action dated Aug. 3, 2018.
U.S. Appl. No. 15/393,855 Final Office Action dated Oct. 12, 2018.
U.S. Appl. No. 15/711,695 Office Action dated Oct. 5, 2018.
U.S. Appl. No. 15/711,961 Office Action dated Oct. 5, 2018.
U.S. Appl. No. 15/394,391 Office Action dated Feb. 23, 2018.
U.S. Appl. No. 15/393,855 Office Action dated May 16, 2018.
U.S. Appl. No. 15/394,473, Dennis Castleman, UAV Battery Form Factor and Insertion/Ejection Methodologies, filed Dec. 29, 2016.
U.S. Appl. No. 15/394,313, Michael Taylor, Proximity Based Noise and Chat, filed Dec. 29, 2016.
Bai, Z., Blackwell, A., Coulouris, G.; Using augmented reality to elicit pretend play for children with autism. IEEE Transactions on Visualization & Computer Graphics. May 1, 2015(1):1.
Thon S, Serena-Allier D, Salvetat C, Lacotte F.; "Flying a dron in a museum an augmented-reality serious game in a Provence", InDigital Heritage International Congress (DigitalHeritage), Oct. 28, 2013 (vol. 2, pp. 669-676), IEEE. (Year: 2013).
U.S. Appl. No. 15/394,329 Final Office Action dated Feb. 25, 2019.
U.S. Appl. No. 15/394,285 Final Office Action dated Feb. 26, 2019.
U.S. Appl. No. 15/393,855 Office Action dated Feb. 1, 2019.
PCT Application No. PCT/US2017/048064 International Preliminary Report on Patentability dated Apr. 2, 2019.
U.S. Appl. No. 15/394,267 Final Office Action dated Apr. 19, 2019.
U.S. Appl. No. 16/121,441 Office Action dated May 15, 2019.
U.S. Appl. No. 15/393,855 Final Office Action dated May 17, 2019.

* cited by examiner

UAV POSITIONAL ANCHORS

CROSS REFERENCE TO RELATED APPLICATIONS

The present application claims the priority benefit of U.S. patent application 62/402,609 filed Sep. 30, 2016, the disclosure of which is incorporated herein by reference.

BACKGROUND OF THE INVENTION

1. Field of the Invention

The present invention generally relates to unmanned aerial vehicles (UAVs). More specifically, the present invention relates to positional anchors for UAVs.

2. Description of the Related Art

An unmanned aerial vehicle (UAV)—also commonly called a drone—is a type of aircraft that may be controlled with varying degrees of autonomy or direction by a remote human pilot. UAVs are available in a variety of different sizes, configurations, power, maneuverability, and peripheral devices, such as cameras, sensors, radar, sonar, etc. Common uses for UAVs include aerial photography, surveillance, and delivery of a variety of payloads, as well as recreational and hobby usage.

FIG. 1 illustrates an exemplary unmanned aerial vehicle (UAV) 100. As noted above, UAVs may be used to surveil and capture images of a location. A UAV may be flown, for example, over and around a location while an onboard camera or other type of sensor gathers or captures data (e.g., images, measurements) regarding the location. Such information may be used to construct a map or other type of illustrative diagram regarding the conditions at the location. Such mapping may use a variety of information captured by any combination of cameras or other type of sensors carried by the UAV, as well as use algorithms for simultaneous localization and mapping (SLAM), photometry, light detection and ranging (LiDAR), and other cartographic or topographic data analysis.

In a recreational context, UAVs may be flown in a variety of races, games, or other competitive activity. For more variety and challenge, such games may be placed in a virtual or augmented environment. Alternatively, variety and challenge may be added via various objects to be used in the game or other activity. Incorporating such objects in games taking place in a virtual or augmented environment may be challenging, however, as they may need to be tracked within the real-world as well as virtual environment.

There is, therefore, a need in the art for improved systems and methods for UAV positional anchors.

SUMMARY OF THE CLAIMED INVENTION

Embodiments of the present invention allow unmanned aerial vehicle (UAV) positional anchors. Signals may be broadcast via a signal interface of an anchor in a defined space which also includes a UAV. The UAV is at one location within the defined space, and the anchor is at another location within the defined space. A virtual environment may be generated that corresponds to the defined space. The virtual environment may include at least one virtual element, and a location of the virtual element within the virtual environment may be based on the location of the anchor within the defined space. A visual indication may be generated when the UAV is detected within a predetermined distance from the location of the anchor. In some embodiments, a visual element may be generated to augment the anchor where a location of the visual element is based on a location of the anchor within the defined space. The visual element may be changed when the UAV is flown to the location of the anchor within the defined space.

Various embodiments of the present invention may include systems for UAV positional anchors. Such systems may include an unmanned aerial vehicle (UAV) at one location within a defined space and at least one anchor at another location within the defined space. The anchor may include a signal interface that broadcasts signals. The system may further include a virtual reality system that generates a virtual environment corresponding to the defined space that include at least one virtual element, whose placement within the virtual environment is based on the location of the anchor within the defined space. The virtual reality system may further generate a visual indication within the virtual environment when the UAV is detected within a predetermined distance from the location of the anchor within the defined space.

Additional embodiments of the present invention may further include methods for unmanned aerial vehicle (UAV) positional anchors. Such methods may include broadcasting signals via a signal interface of at least one anchor, generating a virtual environment corresponding to the defined space that includes at least one virtual element placed within the virtual environment based on the location of the anchor within the defined space, and generating a visual indication within the virtual environment when the UAV is detected within a predetermined distance from the location of the at least one anchor within the defined space.

Further embodiments of the present invention may further include non-transitory computer-readable storage media, having embodied thereon a program executable by a processor to perform methods for unmanned aerial vehicle (UAV) positional anchors as described herein.

DETAILED DESCRIPTION

Embodiments of the present invention allow unmanned aerial vehicle (UAV) positional anchors. Signals may be broadcast via a signal interface of an anchor in a defined space which also includes a UAV. The UAV is at one location within the defined space, and the anchor is at another location within the defined space. A virtual environment may be generated that corresponds to the defined space. The virtual environment may include at least one virtual element, and a location of the virtual element within the virtual environment may be based on the location of the anchor within the defined space. A visual indication may be generated when the UAV is detected within a predetermined distance from the location of the anchor. In some embodiments, a visual element may be generated to augment the anchor where a location of the visual element is based on a location of the anchor within the defined space. The visual element may be changed when the UAV is flown to the location of the anchor within the defined space.

Figure 1:
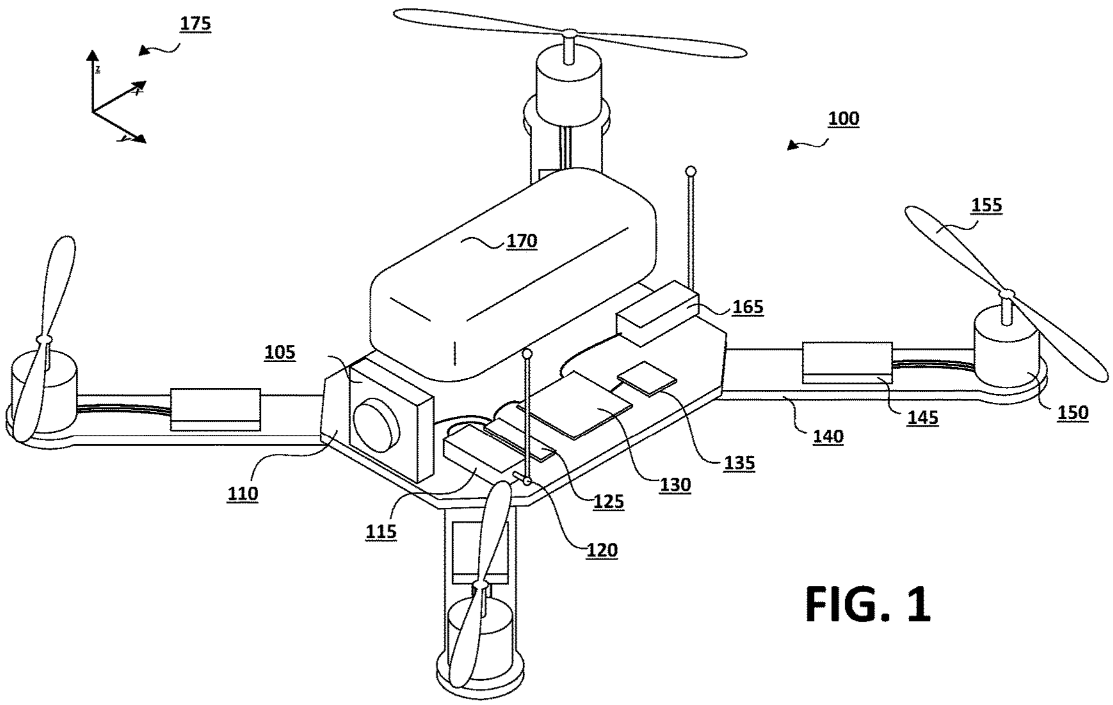
FIG. 1 illustrates an exemplary unmanned aerial vehicle (UAV) that may be used in implementations of the present invention.

FIG. 1 illustrates an exemplary unmanned aerial vehicle (UAV) that may be used in implementations of the present invention. In some embodiments, UAV 100 has main body 110 with one or more arms 140. The proximal end of arm 140 can attach to main body 110 while the distal end of arm 140 can secure motor 150. Arms 140 can be secured to main body 110 in an "X" configuration, an "H" configuration, a "T" configuration, or any other configuration as appropriate. The number of motors 150 can vary, for example there can be three motors 150 (e.g., a "tricopter"), four motors 150 (e.g., a "quadcopter"), eight motors (e.g., an "octocopter"), etc.

In some embodiments, each motor 155 rotates (e.g., the drive shaft of motor 155 spins) about parallel axes. For example, the thrust provided by all propellers 155 can be in the Z direction. Alternatively, a motor 155 can rotate about an axis that is perpendicular (or any angle that is not parallel) to the axis of rotation of another motor 155. For example, two motors 155 can be oriented to provide thrust in the Z direction (e.g., to be used in takeoff and landing) while two motors 155 can be oriented to provide thrust in the X direction (e.g., for normal flight). In some embodiments, UAV 100 can dynamically adjust the orientation of one or more of its motors 150 for vectored thrust.

In some embodiments, the rotation of motors 150 can be configured to create or minimize gyroscopic forces. For example, if there are an even number of motors 150, then half of the motors can be configured to rotate counter-clockwise while the other half can be configured to rotate clockwise. Alternating the placement of clockwise and counter-clockwise motors can increase stability and enable UAV 100 to rotate about the z-axis by providing more power to one set of motors 150 (e.g., those that rotate clockwise) while providing less power to the remaining motors (e.g., those that rotate counter-clockwise).

Motors 150 can be any combination of electric motors, internal combustion engines, turbines, rockets, etc. In some embodiments, a single motor 150 can drive multiple thrust components (e.g., propellers 155) on different parts of UAV 100 using chains, cables, gear assemblies, hydraulics, tubing (e.g., to guide an exhaust stream used for thrust), etc. to transfer the power.

In some embodiments, motor 150 is a brushless motor and can be connected to electronic speed controller X45. Electronic speed controller 145 can determine the orientation of magnets attached to a drive shaft within motor 150 and, based on the orientation, power electromagnets within motor 150. For example, electronic speed controller 145 can have three wires connected to motor 150, and electronic speed controller 145 can provide three phases of power to the electromagnets to spin the drive shaft in motor 150. Electronic speed controller 145 can determine the orientation of the drive shaft based on back-emf on the wires or by directly sensing to position of the drive shaft.

Transceiver 165 can receive control signals from a control unit (e.g., a handheld control transmitter, a server, etc.). Transceiver 165 can receive the control signals directly from the control unit or through a network (e.g., a satellite, cellular, mesh, etc.). The control signals can be encrypted. In some embodiments, the control signals include multiple channels of data (e.g., "pitch," "yaw," "roll," "throttle," and auxiliary channels). The channels can be encoded using pulse-width-modulation or can be digital signals. In some embodiments, the control signals are received over TC/IP or similar networking stack.

In some embodiments, transceiver 165 can also transmit data to a control unit. Transceiver 165 can communicate with the control unit using lasers, light, ultrasonic, infra-red, Bluetooth, 602.11x, or similar communication methods, including a combination of methods. Transceiver can communicate with multiple control units at a time.

Position sensor 135 can include an inertial measurement unit for determining the acceleration and/or the angular rate of UAV 100, a GPS receiver for determining the geolocation and altitude of UAV 100, a magnetometer for determining the surrounding magnetic fields of UAV 100 (for informing the heading and orientation of UAV 100), a barometer for determining the altitude of UAV 100, etc. Position sensor 135 can include a land-speed sensor, an air-speed sensor, a celestial navigation sensor, etc.

UAV 100 can have one or more environmental awareness sensors. These sensors can use sonar, LiDAR, stereoscopic imaging, computer vision, etc. to detect obstacles and determine the nearby environment. For example, a collision avoidance system can use environmental awareness sensors to determine how far away an obstacle is and, if necessary, change course.

Position sensor 135 and environmental awareness sensors can all be one unit or a collection of units. In some embodiments, some features of position sensor 135 and/or the environmental awareness sensors are embedded within flight controller 130.

In some embodiments, an environmental awareness system can take inputs from position sensors 135, environmental awareness sensors, databases (e.g., a predefined mapping of a region) to determine the location of UAV 100, obstacles, and pathways. In some embodiments, this environmental awareness system is located entirely on UAV 100, alternatively, some data processing can be performed external to UAV 100.

Camera 105 can include an image sensor (e.g., a CCD sensor, a CMOS sensor, etc.), a lens system, a processor, etc. The lens system can include multiple movable lenses that can be adjusted to manipulate the focal length and/or field of view (e.g., zoom) of the lens system. In some embodiments, camera 105 is part of a camera system which includes multiple cameras 105. For example, two cameras 105 can be used for stereoscopic imaging (e.g., for first person video, augmented reality, etc.). Another example includes one camera 105 that is optimized for detecting hue and saturation information and a second camera 105 that is optimized for detecting intensity information. In some embodiments, camera 105 optimized for low latency is used for control systems while a camera 105 optimized for quality is used for recording a video (e.g., a cinematic video). Camera 105 can be a visual light camera, an infrared camera, a depth camera, etc.

A gimbal and dampeners can help stabilize camera 105 and remove erratic rotations and translations of UAV 100. For example, a three-axis gimbal can have three stepper motors that are positioned based on a gyroscope reading in order to prevent erratic spinning and/or keep camera 105 level with the ground.

Video processor 125 can process a video signal from camera 105. For example video process 125 can enhance the image of the video signal, down-sample or up-sample the resolution of the video signal, add audio (captured by a microphone) to the video signal, overlay information (e.g., flight data from flight controller 130 and/or position sensor), convert the signal between forms or formats, etc.

Video transmitter 120 can receive a video signal from video processor 125 and transmit it using an attached antenna. The antenna can be a cloverleaf antenna or a linear antenna. In some embodiments, video transmitter 120 uses a different frequency or band than transceiver 165. In some embodiments, video transmitter 120 and transceiver 165 are part of a single transceiver.

Battery 170 can supply power to the components of UAV 100. A battery elimination circuit can convert the voltage from battery 170 to a desired voltage (e.g., convert 12 v from battery 170 to 5 v for flight controller 130). A battery elimination circuit can also filter the power in order to minimize noise in the power lines (e.g., to prevent interference in transceiver 165 and transceiver 120). Electronic speed controller 145 can contain a battery elimination circuit. For example, battery 170 can supply 12 volts to electronic speed controller 145 which can then provide 5 volts to flight controller 130. In some embodiments, a power distribution board can allow each electronic speed controller (and other devices) to connect directly to the battery.

In some embodiments, battery 170 is a multi-cell (e.g., 2S, 3S, 4S, etc.) lithium polymer battery. Battery 170 can also be a lithium-ion, lead-acid, nickel-cadmium, or alkaline battery. Other battery types and variants can be used as known in the art. Additional or alternative to battery 170, other energy sources can be used. For example, UAV 100 can use solar panels, wireless power transfer, a tethered power cable (e.g., from a ground station or another UAV 100), etc. In some embodiments, the other energy source can be utilized to charge battery 170 while in flight or on the ground.

Battery 170 can be securely mounted to main body 110. Alternatively, battery 170 can have a release mechanism. In some embodiments, battery 170 can be automatically replaced. For example, UAV 100 can land on a docking station and the docking station can automatically remove a discharged battery 170 and insert a charged battery 170. In some embodiments, UAV 100 can pass through docking station and replace battery 170 without stopping.

Battery 170 can include a temperature sensor for overload prevention. For example, when charging, the rate of charge can be thermally limited (the rate will decrease if the temperature exceeds a certain threshold). Similarly, the power delivery at electronic speed controllers 145 can be thermally limited—providing less power when the temperature exceeds a certain threshold. Battery 170 can include a charging and voltage protection circuit to safely charge battery 170 and prevent its voltage from going above or below a certain range.

UAV 100 can include a location transponder. For example, in a racing environment, race officials can track UAV 100 using location transponder. The actual location (e.g., X, Y, and Z) can be tracked using triangulation of the transponder. In some embodiments, gates or sensors in a track can determine if the location transponder has passed by or through the sensor or gate.

Flight controller 130 can communicate with electronic speed controller 145, battery 170, transceiver 165, video processor 125, position sensor 135, and/or any other component of UAV 100. In some embodiments, flight controller 130 can receive various inputs (including historical data) and calculate current flight characteristics. Flight characteristics can include an actual or predicted position, orientation, velocity, angular momentum, acceleration, battery capacity, temperature, etc. of UAV 100. Flight controller 130 can then take the control signals from transceiver 165 and calculate target flight characteristics. For example, target flight characteristics might include “rotate x degrees” or “go to this GPS location”. Flight controller 130 can calculate response characteristics of UAV 100. Response characteristics can include how electronic speed controller 145, motor 150, propeller 155, etc. respond, or are expected to respond, to control signals from flight controller 130. Response characteristics can include an expectation for how UAV 100 as a system will respond to control signals from flight controller 130. For example, response characteristics can include a determination that one motor 150 is slightly weaker than other motors.

After calculating current flight characteristics, target flight characteristics, and response characteristics flight controller 130 can calculate optimized control signals to achieve the target flight characteristics. Various control systems can be implemented during these calculations. For example a proportional-integral-derivative (PID) can be used. In some embodiments, an open-loop control system (i.e., one that ignores current flight characteristics) can be used. In some embodiments, some of the functions of flight controller 130 are performed by a system external to UAV 100. For example, current flight characteristics can be sent to a server that returns the optimized control signals. Flight controller 130 can send the optimized control signals to electronic speed controllers 145 to control UAV 100.

In some embodiments, UAV 100 has various outputs that are not part of the flight control system. For example, UAV 100 can have a loudspeaker for communicating with people or other UAVs 100. Similarly, UAV 100 can have a flashlight or laser. The laser can be used to “tag” another UAV 100.

Figure 2:
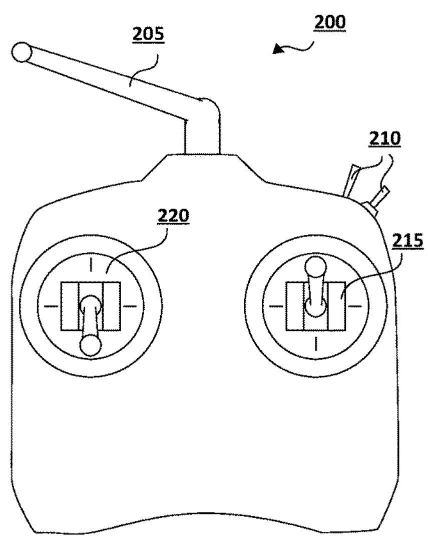
FIG. 2 illustrates an exemplary control transmitter used to control a UAV that may be used in implementations of the present invention.

FIG. 2 illustrates an exemplary control transmitter 200 used to control a UAV that may be used in implementations of the present invention. Control transmitter 200 can send control signals to transceiver 165. Control transmitter can have auxiliary switches 210, joysticks 215 and 220, and antenna 205. Joystick 215 can be configured to send elevator and aileron control signals while joystick 220 can be configured to send throttle and rudder control signals (this is termed a mode 2 configuration). Alternatively, joystick 215 can be configured to send throttle and aileron control signals while joystick 220 can be configured to send elevator and rudder control signals (this is termed a mode 1 configuration). Auxiliary switches 210 can be configured to set options on control transmitter 200 or UAV 100. In some embodiments, control transmitter 200 receives information from a transceiver on UAV 100. For example, it can receive some current flight characteristics from UAV 100.

Figure 3:
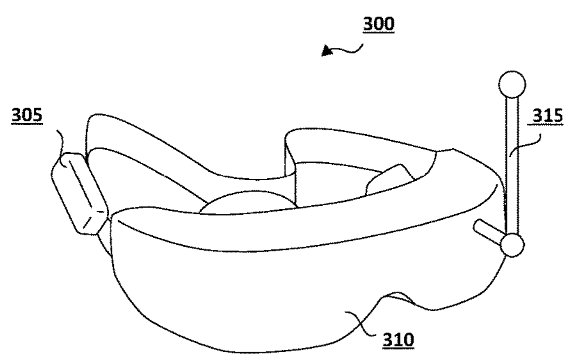
FIG. 3 illustrates an exemplary virtual reality system headset that may be used in implementations of the present invention.

FIG. 3 illustrates an exemplary augmented or virtual reality system 300 that may be used in implementations of the present invention. Augmented or virtual reality system 300 may include battery 305 or another power source, display screen 310, and receiver 315. Augmented or virtual reality system 300 can receive a data stream (e.g., video) from transmitter 120 of UAV 100. Augmented or virtual reality system 300 may include a head-mounted unit as depicted in FIG. 3. Augmented or virtual reality system 300 can also include a monitor, projector, or a plurality of additional head-mounted units such that multiple viewers can view the same augmented or virtual environment.

Augmented or virtual reality system 300 may generate a display of an artificial image to overlay the view of the real world (e.g., augmented reality) or to create an independent reality all its own (e.g., virtual reality). Depending on whether the system is set up for augmented or virtual reality, display screen 310 may be partly transparent or translucent—thereby allowing the user to observe real-world surroundings—or display 310 may be a displayed computer generated image, or a combination of the two. The virtual environment generated by augmented or virtual reality system 300 and presented to the user may include any of the real-world surroundings, any physical objects (which may be augmented or not), or generate wholly virtual objects.

In some embodiments, display screen 310 includes two screens, one for each eye; these screens can have separate signals for stereoscopic viewing. In some embodiments, receiver 315 may be coupled to display screen 310 (as shown in FIG. 3). Alternatively, receiver 315 can be a separate unit that is connected using a wire to augmented or virtual reality system 300. In some embodiments, augmented or virtual reality system 300 is coupled to control transmitter 200. Augmented or reality system 300 may further be communicatively coupled to a computing device (not pictured) such as that illustrated in and described with respect to FIG. 6.

Figure 4:
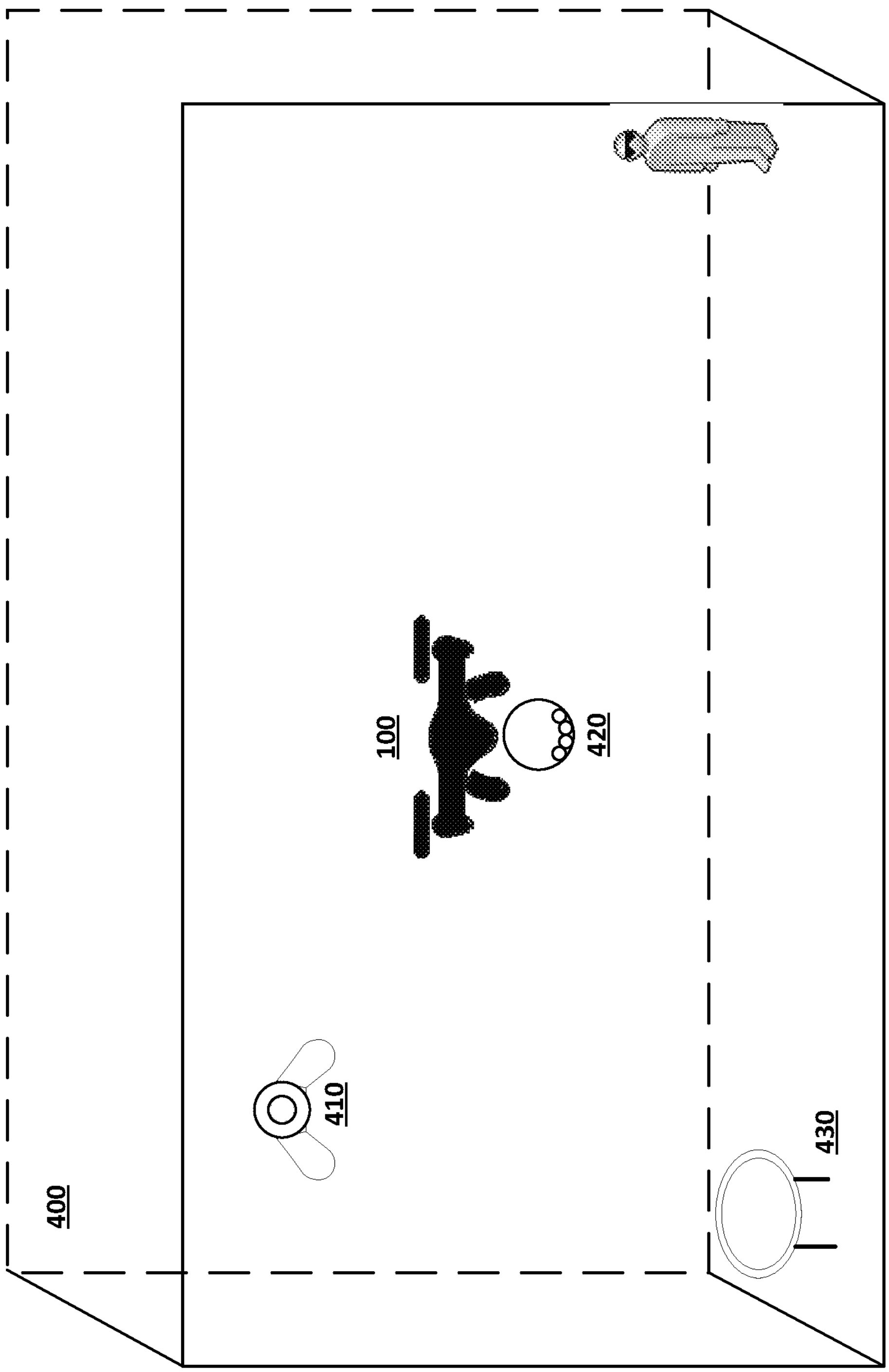
FIG. 4 illustrates an exemplary physical space within which a system for UAV positional anchors may be implemented.

FIG. 4 illustrates an exemplary physical space 400 within which a system for UAV positional anchors may be implemented. As illustrated, the physical space 400 may include a UAV 100, as well as variety of anchors 410-430. Such anchors may be augmented or be represented by a virtual object in a virtual environment. Such augmentation or virtual object representation may appear with decorative, thematic, or other visual features as generated by an augmented or virtual reality system 300.

Each anchor 410-430 is equipped with a signal interface that broadcasts signals throughout the space. Such signals may be ultrasonic, light-based, or other types of beacon signal known in the art. Such signals may be detected by an augmented or virtual reality system 300, which may use such signals to locate the anchor (which may or may not be moving during the game). The location of the anchor may be used to adjust the corresponding augmented or virtual representation. Where an anchor 410-420 moves or may be moved, the signals broadcast by the respective anchor allows the augmented or virtual reality system 300 to track its respective location in real-time, as well as to update the augmented or virtual display based on the real-time location.

Such anchors 410-430 may have different roles depending on the parameters of a game or competition. Some anchors 410 may be mobile and may be an object for the UAV 100 to chase (or to be chased by) through the space 400 during the course of a game. Some anchors 420 may be carried by the UAV 100, and other anchors 430 may be stationary. Different combinations of anchors 410-430 may be incorporated into various games in different capacities. When the UAV 100 is near to an anchor 410-430, certain indications may be generated to indicate certain statuses, scores, bonuses, notifications, information regarding a new challenge, etc.

The object of the game may be for the UAV 100 to catch a mobile anchor 410, to find a hidden anchor 420, bring one anchor 420 to another anchor 430, or race from one to another anchor 410-430. Such anchors 410-430 may represent markers where additional challenges or events may occur. Different anchors 410-430 may be associated with different points or scores, as may be the actions involving such anchors 410-430. Such game parameters may be indicated visually in the augmented or virtual environment.

The user may view the UAV from his or her physical location within the space 400 while flying the UAV. Depending on settings of the augmented or virtual reality system 300, the user may also be provided with a first person view of the augmented or virtual environment corresponding to the view as seen from the UAV. The augmented or virtual reality system 300 therefore provides the user with a flight simulation experience corresponding to the actual physical flight of the UAV 100.

Figure 5:
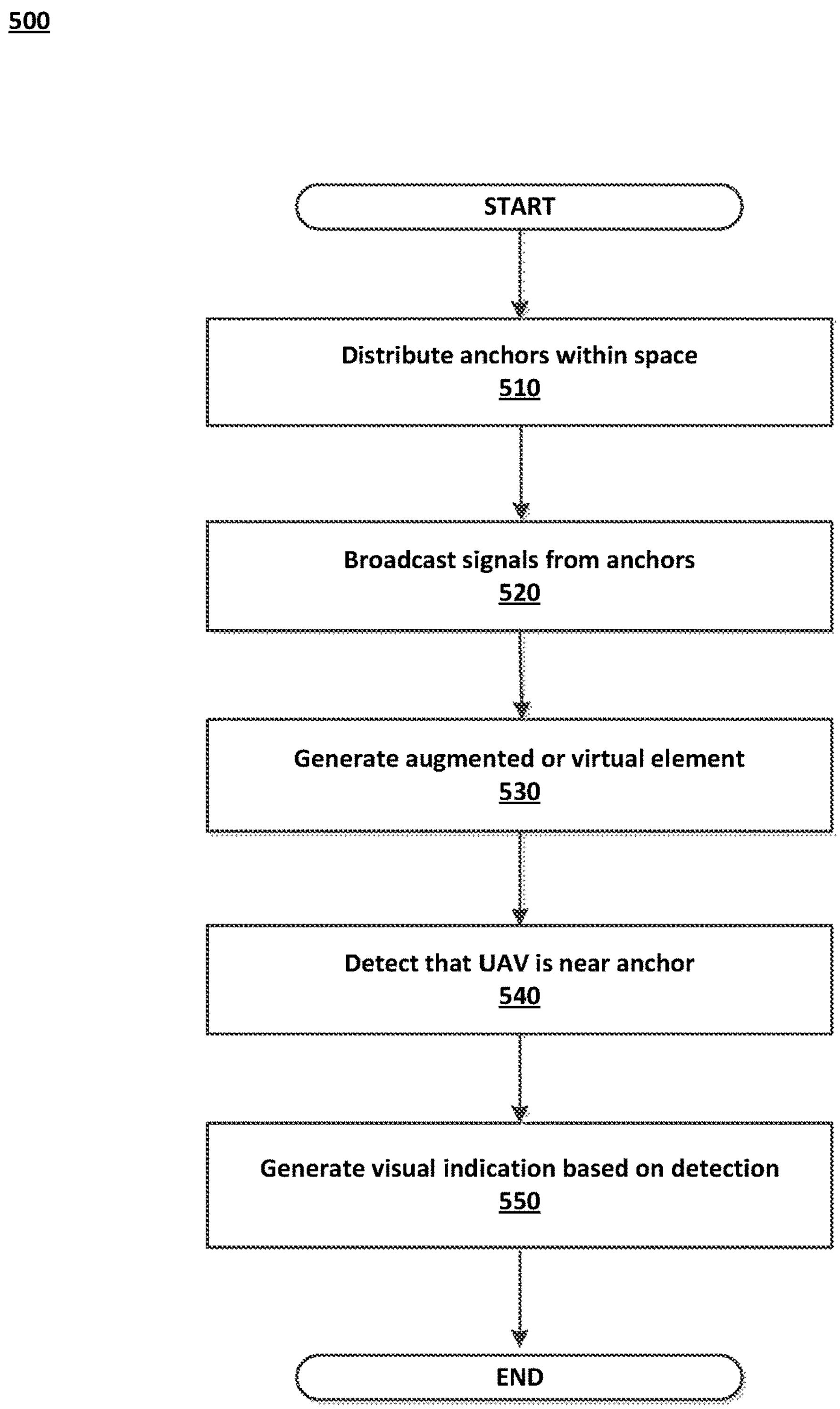
FIG. 5 is a flowchart illustrating an exemplary method for UAV course positional anchors.

FIG. 5 is a flowchart illustrating an exemplary method 500 for UAV positional anchors. The method 500 of FIG. 5 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 5 (and the order thereof) are exemplary and may include various alternatives, equivalents, or derivations thereof including but not limited to the order of execution of the same.

In step 510, one or more anchors are distributed throughout a space. The number and type of anchors used depends on the object of a particular game or challenge. As described above, such anchors may vary in size/weight, mobility, etc. Stationary anchors may be distributed to serve as markers for a race or obstacle course. Mobile anchors may chase the UAV(s), or the UAV(s) may chase the mobile anchor. Further, some anchors may themselves be carried from one location to another (e.g. the location of another anchor).

In step 520, signals are broadcast from each anchor. As noted above, such signals may be in any form known in the art, including ultrasonic, light-based, or other type of beacon signal. Such signals may be detectable to an augmented or virtual reality system present in the space.

In step 530, the augmented or virtual reality system may generate augmentation or virtual elements that correspond to the anchor. An augmented reality system may simply augment the anchor, while a virtual reality system may generate a virtual environment corresponding to the space and that includes a virtual element corresponding to the anchor. Such anchor may be represented in the virtual environment by the virtual element, which may be placed within the virtual environment in accordance with the location of the anchor within the space. The type of augmentation or virtual elements may be based on user preference or selection. In some embodiments, the user may be offered a menu of virtual elements, themes, or templates that may be used to generate the augmentation or virtual element.

In step 540, a UAV may be detected as being near an anchor. The UAV may be flying through various locations within the space. When the UAV is detected as being within a predetermined distance from an anchor, such detection may serve as a trigger. Depending on the object of the game, the proximity of the UAV to the anchor may indicate that the UAV has won a race, reached a milestone or other goal, caught up to a quarry being chased, collided with an obstacle, been caught or tagged by a chaser, etc.

In step 550, a visual indication may be generated based on the detection of step 540. As above, the type of visual indication depends on the type of game, as well as what the proximity between the UAV and anchor may indicate. Such indications may include score, an updated scoreboard, an in-game bonus, a notification, and information regarding a new challenge.

Figure 6:
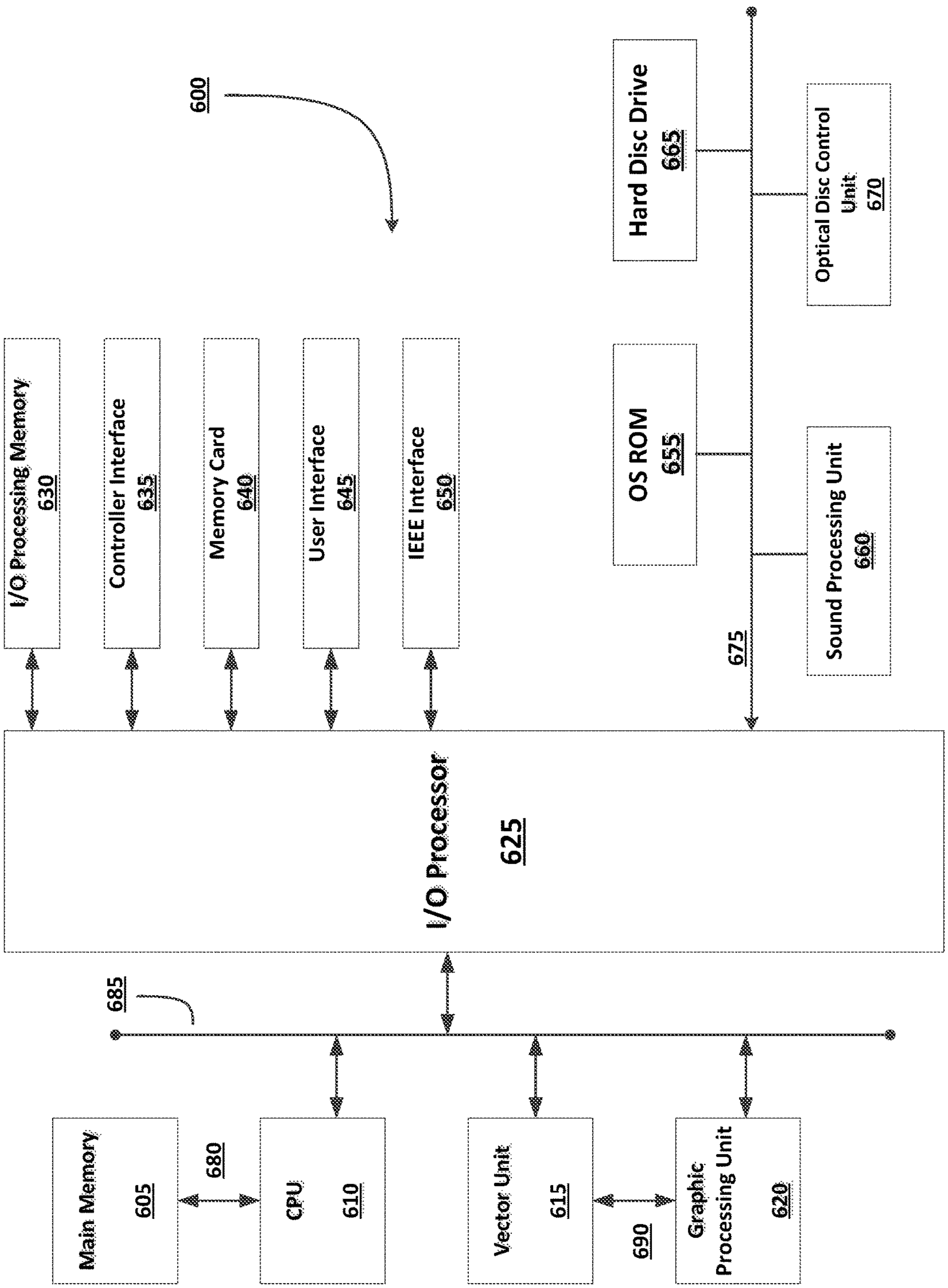
FIG. 6 is an exemplary electronic entertainment system that may be used with a virtual or augmented reality system in implementing UAV positional anchors.

FIG. 6 is a block diagram of an exemplary electronic entertainment system 600. The entertainment system 600 of FIG. 6 includes a main memory 605, a central processing unit (CPU) 610, vector unit 615, a graphics processing unit 620, an input/output (I/O) processor 625, an I/O processor memory 630, a controller interface 635, a memory card 640, a Universal Serial Bus (USB) interface 645, and an IEEE interface 650. The entertainment system 600 further includes an operating system read-only memory (OS ROM) 655, a sound processing unit 660, an optical disc control unit 670, and a hard disc drive 665, which are connected via a bus 675 to the I/O processor 625.

Entertainment system 600 may be an electronic game console. Alternatively, the entertainment system 600 may be implemented as a general-purpose computer, a set-top box, a hand-held game device, a tablet computing device, or a mobile computing device or phone. Entertainment systems may contain more or less operating components depending on a particular form factor, purpose, or design.

The CPU 610, the vector unit 615, the graphics processing unit 620, and the I/O processor 625 of FIG. 6 communicate via a system bus 685. Further, the CPU 610 of FIG. 6 communicates with the main memory 605 via a dedicated bus 680, while the vector unit 615 and the graphics processing unit 620 may communicate through a dedicated bus 690. The CPU 610 of FIG. 6 executes programs stored in the OS ROM 655 and the main memory 605. The main memory 605 of FIG. 6 may contain pre-stored programs and programs transferred through the I/O Processor 625 from a CD-ROM, DVD-ROM, or other optical disc (not shown) using the optical disc control unit 670. I/O Processor 625 of FIG. 6 may also allow for the introduction of content transferred over a wireless or other communications network (e.g., 4$, LTE, 3G, and so forth). The I/O processor 625 of FIG. 6 primarily controls data exchanges between the various devices of the entertainment system 600 including the CPU 610, the vector unit 615, the graphics processing unit 620, and the controller interface 635.

The graphics processing unit 620 of FIG. 6 executes graphics instructions received from the CPU 610 and the vector unit 615 to produce images for display on a display device (not shown). For example, the vector unit 615 of FIG. 6 may transform objects from three-dimensional coordinates to two-dimensional coordinates, and send the two-dimensional coordinates to the graphics processing unit 620. Furthermore, the sound processing unit 660 executes instructions to produce sound signals that are outputted to an audio device such as speakers (not shown). Other devices may be connected to the entertainment system 600 via the USB interface 645, and the IEEE interface 650 such as wireless transceivers, which may also be embedded in the system 600 or as a part of some other component such as a processor.

A user of the entertainment system 600 of FIG. 6 provides instructions via the controller interface 635 to the CPU 610. For example, the user may instruct the CPU 610 to store certain game information on the memory card 640 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for unmanned aerial vehicle (UAV) positional anchors, the system comprising:

- an unmanned aerial vehicle (UAV) at one location within a defined space;
- at least one anchor at another location within the defined space, the at least one anchor comprising a signal interface that broadcasts signals; and
- a virtual reality system that:
  - generates a virtual environment corresponding to the defined space, the virtual environment comprising at least one virtual element, wherein a location of the at least one virtual element within the virtual environment is based on the location of at least one anchor within the defined space, and
  - generates a visual indication within the virtual environment when the UAV is detected within a predetermined distance from the location of the at least one anchor within the defined space.

2. The system of claim 1, wherein the virtual reality system further comprises a transceiver that detects signals broadcast by the at least one anchor.

3. The system of claim 1, wherein the virtual reality system further comprises a processor that determines a location for the at least one anchor based on the signals broadcast by the at least one anchor.

4. The system of claim 1, wherein the signals broadcast by the anchors include at least one of ultrasonic, light-based, or beacon signal.

5. The system of claim 1, wherein another anchor detects that the UAV is at the location of the at least one anchor and the other anchor is triggered to begin broadcasting signals, wherein the virtual reality system generates a new virtual element corresponding to the other anchor.

6. The system of claim 1, wherein the visual indication includes at least one of an updated score, an updated scoreboard, an in-game bonus, a notification, and information regarding a new challenge.

7. The system of claim 1, wherein the UAV is capable of carrying the at least one anchor during flight.

8. The system of claim 7, wherein the UAV carries the at least one anchor to at least one other anchor, and wherein the virtual reality system generates a visual indication responsive to the at least one anchor being detected within a predetermined distance from the at least one other anchor.

9. The system of claim 1, wherein the at least one anchor is capable of moving, and wherein the virtual reality system updates the location of the at least one virtual element within the virtual environment based on the movement of the least one anchor.

10. The system of claim 9, wherein the UAV chases after the moving anchor, and wherein the visual indication indicates that the UAV has caught the moving anchor.

11. The system of claim 9, wherein the at least one anchor chases the UAV, and wherein the visual indicator indicates that the anchor has crashed into the UAV.

12. The system of claim 6, further comprising a plurality of other anchors, wherein each anchor is associated with a respective virtual element having a different appearance within the virtual environment than the virtual element corresponding to the at least one anchor.

13. A system for unmanned aerial vehicle (UAV) positional anchors, the system comprising:
- an unmanned aerial vehicle (UAV) at one location within a defined space;
- at least one anchor at another location within the defined space, the at least one anchor comprising a signal interface that broadcasts signals; and
- an augmented reality system that:
  - generates at least one visual element to augment the at least one anchor, wherein a location of the at least one visual element is based on a location of at least one anchor within the defined space, and
  - changes the at least one visual element when the UAV is flown to the location of the at least one anchor within the defined space.

14. A method for unmanned aerial vehicle (UAV) positional anchors, the method comprising:
- broadcasting signals via a signal interface of at least one anchor, wherein an unmanned aerial vehicle (UAV) is at one location within a defined space, and the at least one sensor is at another location within the defined space; and
- executing instructions stored in memory of a virtual reality system, wherein execution of the instructions by a processor of the virtual reality system:
  - generates a virtual environment corresponding to the defined space, the virtual environment comprising at least one virtual element, wherein a location of the at least one virtual element within the virtual environment is based on the location of at least one anchor within the defined space, and
  - generates a visual indication within the virtual environment when the UAV is detected within a predetermined distance from the location of the at least one anchor within the defined space.

15. The method of claim 14, further comprising detecting the signals broadcast by the at least one anchor, the signals detected by the virtual reality system.

16. The method of claim 14, further comprising determining a location for the at least one anchor based on the signals broadcast by the at least one anchor.

17. The method of claim 14, wherein the signals broadcast by the anchors include at least one of ultrasonic, light-based, or beacon signal.

18. The method of claim 14, wherein another anchor detects that the UAV is at the location of the at least one anchor and the other anchor is triggered to begin broadcasting signals, and further comprising generating a new virtual element corresponding to the other anchor.

19. The method of claim 14, wherein the visual indication includes at least one of an updated score, an updated scoreboard, an in-game bonus, a notification, and information regarding a new challenge.

20. The method of claim 14, wherein the UAV is capable of carrying the at least one anchor during flight.

21. The method of claim 14, wherein the UAV carries the at least one anchor to at least one other anchor, and further comprising generating a visual indication responsive to the at least one anchor being detected within a predetermined distance from the at least one other anchor.

22. The method of claim 14, wherein the at least one anchor is capable of moving, and further comprising updating the location of the at least one virtual element within the virtual environment based on the movement of the least one anchor.

23. The method of claim 22, wherein the UAV chases after the moving anchor, and wherein the visual indication indicates that the UAV has caught the moving anchor.

24. The method of claim 22, wherein the at least one anchor chases the UAV, and wherein the visual indicator indicates that the anchor has crashed into the UAV.

25. The method of claim 6, wherein the defined space includes a plurality of other anchors, wherein each anchor is associated with a respective virtual element having a different appearance within the virtual environment than the virtual element corresponding to the at least one anchor.

26. A method for unmanned aerial vehicle (UAV) positional anchors, the method comprising:
- broadcasting signals via a signal interface of at least one anchor, wherein an unmanned aerial vehicle (UAV) is at one location within a defined space, and the at least one sensor is at another location within the defined space; and
- executing instructions stored in memory of an augmented reality system, wherein execution of the instructions by a processor of the augmented reality system:
  - generates at least one visual element to augment the at least one anchor, wherein a location of the at least one visual element is based on a location of at least one anchor within the defined space, and
  - changes the at least one visual element when the UAV is flown to the location of the at least one anchor within the defined space.

27. A non-transitory computer-readable storage medium, having embodied thereon a program executable by a processor to perform a method for unmanned aerial vehicle (UAV) positional anchors, the method comprising:

broadcasting signals via a signal interface of at least one anchor, wherein an unmanned aerial vehicle (UAV) is at one location within a defined space, and the at least one sensor is at another location within the defined space;

generating a virtual environment corresponding to the defined space, the virtual environment comprising at least one virtual element, wherein a location of the at least one virtual element within the virtual environment is based on the location of at least one anchor within the defined space; and generating a visual indication within the virtual environment when the UAV is detected within a predetermined distance from the location of the at least one anchor within the defined space.

28. A non-transitory computer-readable storage medium, having embodied thereon a program executable by a processor to perform a method for unmanned aerial vehicle (UAV) positional anchors, the method comprising:

broadcasting signals via a signal interface of at least one anchor, wherein an unmanned aerial vehicle (UAV) is at one location within a defined space, and the at least one sensor is at another location within the defined space;

generating at least one visual element to augment the at least one anchor, wherein a location of the at least one visual element is based on a location of at least one anchor within the defined space; and changing the at least one visual element when the UAV is flown to the location of the at least one anchor within the defined space.

* * * * *